M. J. CARNEY.
Cylinder-Cam.

No. 163,738.  Patented May 25, 1875.

WITNESSES
Henry N. Miller
A. L. Everh.

INVENTOR
Martin J. Carney
By Alexander F. Mason
Attorney

UNITED STATES PATENT OFFICE.

MARTIN J. CARNEY, OF TOLEDO, OHIO.

IMPROVEMENT IN CYLINDER-CAMS.

Specification forming part of Letters Patent No. 163,738, dated May 25, 1875; application filed April 23, 1875.

*To all whom it may concern:*

Be it known that I, MARTIN J. CARNEY, of Toledo, in the county of Lucas and in the State of Ohio, have invented certain new and useful Improvements in Cylinder-Cams; and do hereby declare that the following is a full, clear, and exact description thereof, reference being had to the accompanying drawings, and to the letters of reference marked thereon, making a part of this specification.

The nature of my invention consists in the construction and arrangement of a cylinder-cam, whereby the lost motion caused by friction can be easily and quickly taken up, as will be hereinafter more fully set forth.

In order to enable others skilled in the art to which my invention appertains to make and use the same, I will now proceed to describe its construction and operation, referring to the annexed drawing, in which—

Figure 1:
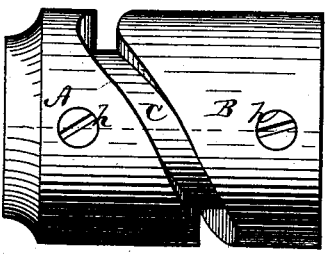
Figure 2:
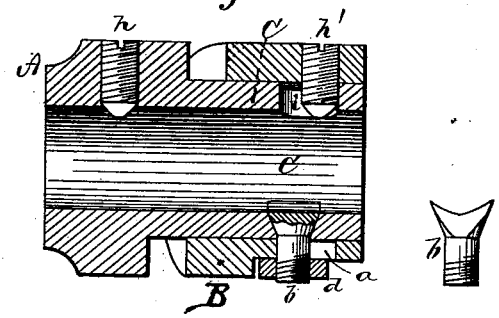

Figure 1 is a side elevation of my improved cylinder-cam, and Fig. 2 is a longitudinal section of the same.

Cylinder-cams, as used in sewing and many other machines, have heretofore most generally been made in one piece, so that when worn by friction the cam becomes worthless, and a new one must be supplied.

With my invention this difficulty is obviated, and all lost motion caused by friction can be easily and accurately taken up.

The cam is made in two parts, A and B, the part A being formed with a projecting cylindrical hub, C, upon which the part B is placed.

In the part B of the cam is an elongated slot, $a$, and from the inside of the hub C is passed a bolt, $b$, through the hub and through the slot $a$, a nut, $d$, being screwed on the outer end of the bolt, thereby securing the said part B on the hub.

By this means, as the cam wears from friction, the part B may be moved farther in and fastened again, so as to take up all lost motion caused by the friction. $h$ and $h'$ are the two set-screws for fastening the cam on its shaft, the set-screw $h'$ passing through a slot, $i$, in the cylindrical hub C to allow of the movement of the part B.

It will thus be seen that in operation the hub C and the movable part B are both connected directly to the shaft by the screws $h$ $h'$, as above described.

This cam is applicable to sewing-machines and all other machinery where cylindrical cams are used.

I do not broadly claim a cylinder-cam made in two parts, with one part adjustable upon the other, as I am aware that such is not new.

Having thus fully described my invention, what I claim as new, and desire to secure by Letters Patent, is—

The combination of the part A, formed with the elongated cylindrical hub C, having slot $i$, and the movable part B, having slot $a$, the bolt $b$, nut $d$, and set-screws $h$ $h'$, which pass through the two parts B and C, for connecting both of the same directly to the shaft, all constructed as and for the purposes herein set forth.

In testimony that I claim the foregoing I have hereunto set my hand and seal this 30th day of March, 1875.

MARTIN J. CARNEY. [L. S.]

Witnesses:
 N. HARRINGTON,
 JOHN HARPER.